United States Patent [19]

Doundoulakis

[11] Patent Number: 4,735,873
[45] Date of Patent: Apr. 5, 1988

[54] QUASI-FLUID STORAGE BATTERY

[76] Inventor: George J. Doundoulakis, 2498 Kayron La., North Bellmore, N.Y. 11710

[21] Appl. No.: 36,715

[22] Filed: Apr. 10, 1987

[51] Int. Cl.$^4$ .................. H01M 4/00; H01M 10/04
[52] U.S. Cl. .................................. 429/49; 429/72; 429/128; 429/208
[58] Field of Search ................ 429/48, 49, 70, 72, 429/52, 128, 95, 100, 110, 113, 208

[56] References Cited

U.S. PATENT DOCUMENTS

| | | | |
|---|---|---|---|
| 3,414,437 | 12/1968 | Doundoulakis et al. | 429/70 |
| 4,147,839 | 4/1979 | Solomon et al. | 429/70 X |
| 4,421,830 | 12/1983 | Schneider et al. | 429/49 |

*Primary Examiner*—Anthony Skapars

[57] ABSTRACT

The object of the invention is to provide the active substances in storage batteries, both the lead acid and alkaline types, in quasi-fluid form so that they can be replaced by newly charged substances, for rejuvenating the battery after long use, or for immediate charge of the battery.

Said battery has a casing (5); active solid cathodic and anodic substances in the form of surface-convoluted negative (15) and positive globules (16), that are close-packed in negative and positive cell compartments (7) and (8) respectively; electrolyte which fills the space between and inside said globules, circulates freely throughout the battery and, if needed, through an external supplementary storage; dielectric separators between cell compartments, electrically insulating negative and positive globules in each cell; and conductive separators providing series connection of adjacent cells.

Other objects for improvement over present batteries include: lower internal resistance; greater extent of charge and discharge at higher current rates; and greater specific Ah storage.

19 Claims, 5 Drawing Sheets

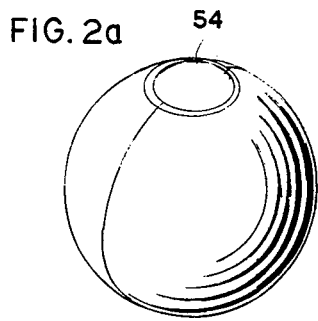
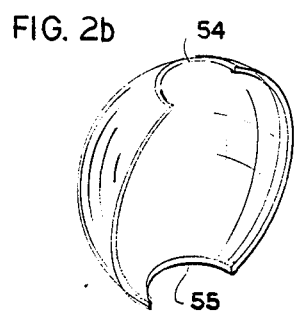
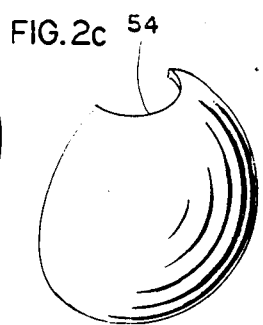
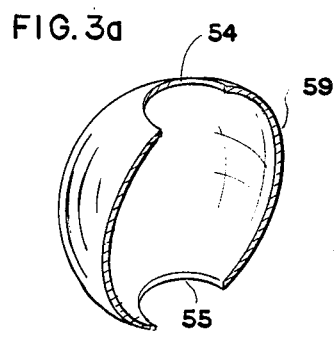
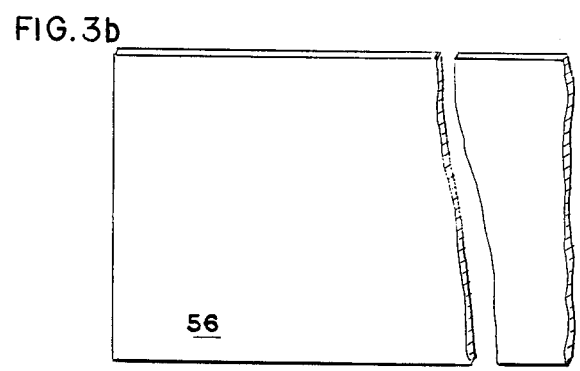
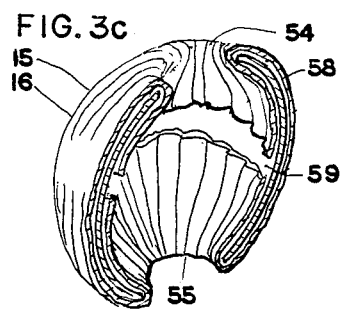
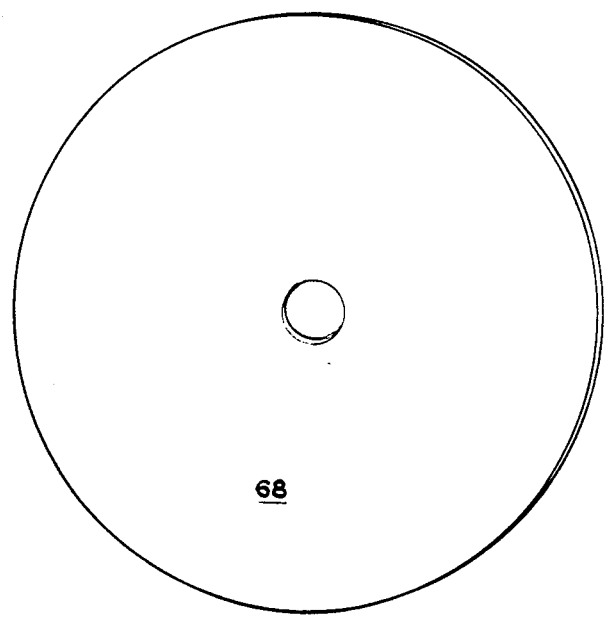
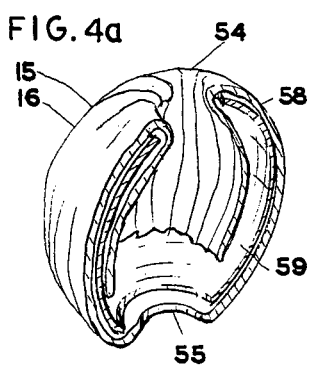

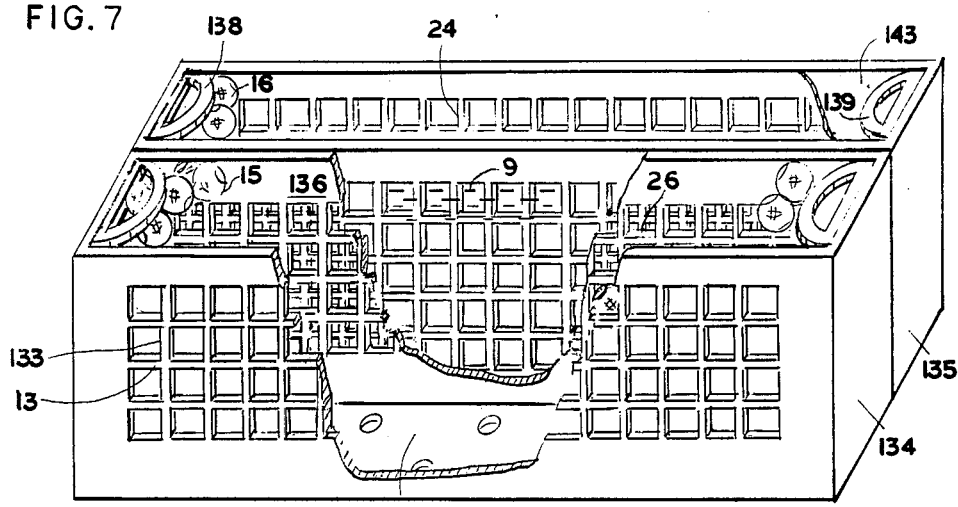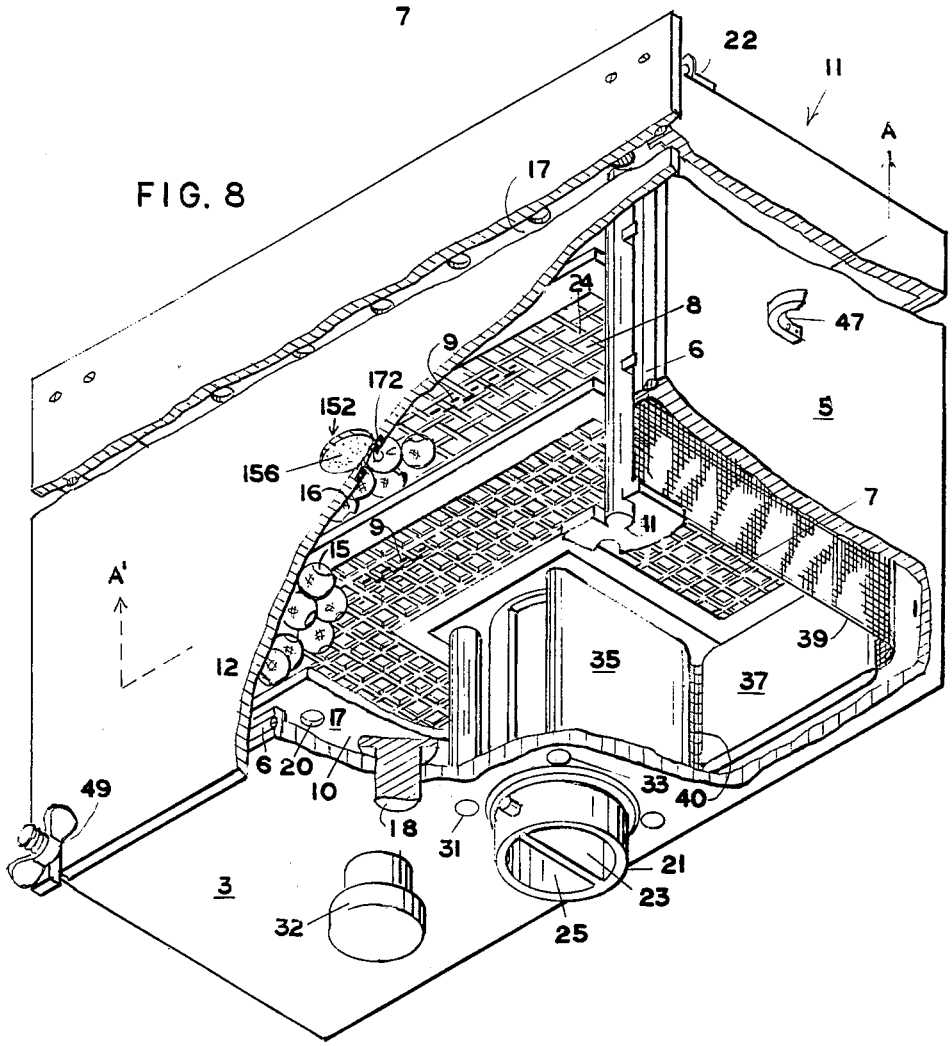

QUASI-FLUID STORAGE BATTERY

DESCRIPTION

1. Technical Field

The present invention relates in general to storage batteries and in particular to a novel battery construction in which cells are formed by negative and positive compartments, each being close-packet, in electrolyte, with surface convoluted globules made of solid active cathodic and anodic substances, respectively, which can be replaced for instantly recharging and/or rejuvenating the battery; the convoluted globules, by exposing a relatively large surface to the electrolyte contribute to a high energy-stored/weight ratio, and a lower internal resistance.

2. Background Art

Heretofore, in conventional batteries, the solid active substances are provided in terms of sets of cathodic and anodic plates, rigidly attached to negative and positive cell electrodes, respectively, while the plates are immersed in electrolyte.

This invention utilizes some structure from a previous patent entitled FLUID CIRCULATING BATTERY SYSTEM, U.S. Pat. No. 3,414,437, by George J. Doundoulakis et al. In this patent solid active substances are provided in terms of separate suspensions of the cathodic and anodic substances in electrolyte. During charge and discharge of the battery, as each suspension is forced to travel between two storage tanks, it encounters electrodes with which it can exchange electrons, while at the same time, it can interact and exchange ions with the electrolyte.

Both the conventional batteries and the Fluid Circulating Battery System are subject to inherent problems which limit their operation and on which the present invention provides improvement.

The conventional storage batteries, as for example would be the lead-acid and alkaline fixed plate type, have the following problems;

A. Conventional Lead Acid Batteries

Conventional lead-acid batteries comprise a number of cells connected in tandem, with each cell being separated from its adjacent cell by a solid wall so that the electrolyte from one cell cannot communicate with the electrolyte in the adjacent cell.

Each cell further comprises a multiplicity of positive and negative plates (7 to 37 plates depending on the model) which are interleaved and firmly attached to respective electrodes. Each plate comprises a grid lattice, often made of antimonial lead, onto which are pressed the active solid substances in the form of powder mixed with cohesive substances to form pastes. In the lead-acid batteries the active materials are $PbO_2$ (Lead dioxide) for the positive plate, and $Pb$ (lead) for the negative plate. The grid acts both as support for the paste and as electrical conductor between particles of the solid active substances and the electrodes of the cell.

Positive and negative plates are rigidly attached alternately to positive and negative electrodes and are held from making electrical contact with the adjacent plate by means of insulating separators, but which are permeable to the electrolyte ions.

A serious drawback of this configuration of conventional lead-acid batteries is that the non-active materials, which make up the grids, the separators, the electrodes and electrode interconnections, occupy as much as half the volume and weight of the battery, without contributing to its Ah (Ampere-hour) capacity.

A second drawback is that only a small portion of the needed electrolyte is physically contained within the plates, where it can easily exchange ions with the solid active substances. The remaining electrolyte is stored outside, around and over the plates. As plates and separators are pressed together, they limit the freedom of movement of the electrolyte ions between those two bodies of electrolyte.

During fast discharges, the allowable density change in the electrolyte that is located between the plates is quickly consumed at only a fraction of the Ah discharge capacity of the battery.

A third drawback of the configuration in lead-acid batteries is the relatively high internal resistance. Some of this resistance is contributed by collisions of the electrolyte ions, as they try to squeeze through the separators and through the outer particle layers to reach particles deep into the paste. A substantial part of the internal resistance is a consequence of collisions of the electrons as they move from particle to particle of the paste to reach the electrodes of the cell. The active substances, in the form of fine powder mixed with cohesive agents, must also act as conductors for the electrons to travel to particles located further away from the grid.

The contact resistance between adjacent particles is, therefore, multiplied by the large number of particles that must be traversed by the electron to reach the grid. The effective resistance between an active particle and the grid thus varies depending on its distance from the grid, from a few ohms for particles located next to the grid, to several thousand ohms for particles located far from the grid. While the overall resistance is greatly reduced due to the high number of parallel paths, the internal resistance still remains high enough for conventional lead acid batteries to lose as much as 30% to 40% of their energy in terms of thermal losses, given by the expression $Wr = I \times I \times R$; where I stands for current expressed in amperes, R is the internal resistance in ohms and Wr represents the energy lost, expressed in watts-hours.

The internal resistance R also affects the output potential of the battery during operation, by introducing a voltage drop, $Vr = I \times R$. Under high rates of discharge the internal voltage drop may become prohibitive, to the extent that the minimum voltage needed by the load is reached at only a fraction of the total energy stored in the battery. If the battery cannot turn the engine to start the car due to a high voltage drop across its internal resistance, it is of little consolation to the user that the battery could provide another 30 Ah under lower current rates.

A fourth drawback of the present configuration of conventional lead-acid batteries is the relatively high rate of self discharge as a consequence of the diffusion of oxidizing and reducing substances from the electrode grids. Due to the proximity of the plates and the relatively low density of the electrolyte, these substances can easily reach the grids of the opposite polarity plates, adjacent to them.

A fifth drawback of the configuration in the conventional lead-acid batteries is their relatively short life. One reason is the oxidation of the positive plate's grid, being converted into active material during charge; thereby losing its strength and conductivity and finally collapsing. Another reason contributing to the battery's deterioration is "shedding" of the active paste material under the influence of heat during high rates of charge and discharge, and the creation of disruptive hydrogen and oxygen bubbles, especially during overcharge.

A sixth drawback in the present configuration of conventional batteries is that the solid active substances in the form of plates cannot be replaced when, for whatever reason, they deteriorate after long usage, at which point the entire battery must be discarded.

While it would also be desirable to be able to easily exchange discharged active substances by charged ones, for an instant charge of the battery, the fixed plate configuration is not conducive to such a feature.

As batteries deteriorate in storage, it is customary to remove the electrolyte after manufacture and the initial charge of the battery. The battery is then shipped dry to be activated by adding battery-grade sulfuric acid as recommended by the manufacturer. However, the process now used to dry the plates from the electrolyte is time consuming, involved, and consequently expensive. While it would, therefore, be desirable to ship the active materials separately from the casing, this is not possible in the conventional configuration of the lead-acid batteries.

B. Alkaline Storage Batteries

Well known alkaline storage batteries are the nickel-iron (Edison cell), the nickel cadmium (Junker cell), and the zinc-manganese dioxide cell.

In the Edison battery the active substances are NI-(OH)2 (Nickel peroxide) as positive, and finely divided Fe (iron) as negative, in 21% KOH (potassium hydroxide) as the electrolyte. During discharge, oxygen is being transferred, via the electrolyte, from the positive to the negative solid active substances. Despite the fact that the electrolyte does not change, and only acts as oxygen transfer agent, its viscosity does affect the internal resistance, indicating that a shorter path for the oxygen ions through the electrolyte would be desirable. Also the contact resistance between the iron particles, multiplied by the large number of such particles, through which the electrons must travel to reach the electrodes, contributes to the internal resistance of the battery. As in lead-acid batteries, the internal resistance causes an internal voltage drop proportional to the current and a heat loss proportional to the square of the current.

It is the high internal resistance of the Edison battery that makes it unsuitable for starting automobiles.

C. Fluid Circulating Battery System

The Fluid Circulating Battery System (U.S. Pat. No. 3,414,437) has the following problems:

The system provides for motion of separate suspensions of the solid cathodic and anodic substances in electrolyte, which exchange electrons as they come in contact, during their motion with stationary metallic electrodes. Unless the moving suspensions are maintained in a sustained turbulent motion, stationary films of the suspension fluid are formed over the electrodes, and as the active substances are heavier than the electrolyte, they tend to settle and miss making contact with the metallic electrode.

The need for providing motion to the suspensions in order that they come in contact with the electodes and the need for providing a pair of storage tanks, for each of the two separate suspensions, introduce complexities, which make the invention unsuitable for small and medium size batteries.

A second drawback in the Fluid Circulating Battery System is its high internal resistance, which is a result of the relatively short time the active solid materials remain in contact with the electrodes, as they move past the electrodes, and the very small normal force of the solid particles toward the electrode surface, leaving the contact resistance high.

A third drawback in the Fluid Circulating Battery System is that at high discharge rates the current tends to fluctuate with the rate at which the charged suspensions move past the electrodes. When the flow is slow the current is limited by the number of solid charged particles that come in contact with the electrodes. The current is increased with faster flow, but in this case the time interval the particles remain in contact with the electrodes in shortened, and more particles miss colliding with the electrodes altogether, so they do not charge or discharge.

A forth drawback in the Fluid Circulating Battery System is that a separate set of metallic electrodes and circulation means must be provided for each cell, making the system heavy and unwieldy when a large number of cells must be present to provide high voltages.

A fifth drawback in the Fluid Circulating Battery System is the need for ionically permeable filter means between positive and negative chambers and between cells, whereas, as shown in this description, the present invention eliminates all ionic filters with the benefit of reduction of weight and internal resistance.

DISCLOSURE OF INVENTION

The present invention helps to eliminate or improve upon the above mentioned problems in the current art, both fixed plate and fluid circulating type batteries.

The present invention comprises a casing, preferably made out of a plastic type material such as polypropylene, which encases the four components of a battery; namely anodic and cathodic active substances, separators, electrolyte and conductive electrodes.

The solid active materials, which in the conventional batteries are provided in terms of fixed plates, in the present invention are provided in terms of compartments close-packed with globules. Preferably, each globule presents a large surface to the electrolyte through a multiplicity of surface convolutions. The globules are distinguished as positive and negative, depending on whether they carry anodic or cathodic substance, respectively. Close-packing of the globules still leaves relatively large spaces in between globules and between the surface folds inside them, for the ions of the electrolyte to move and interact with the solid active substances with relative ease. The contact resistance between globules in the present invention is much lower than that between paste particles in conventional batteries. This is because the contact area between globules is much larger than that between paste particles.

The contact area between globules is further increased as globules are being forced together due to close-packing. A further reason for the internal resistance to be low is that in the present invention the electrons need traverse only a few globules to reach an effective electrode, compared to the great number of paste particles that need be traversed in the case of conventional lead-acid batteris.

The battery in accordance with the present invention can charge and discharge up to nearly its full capacity because the density of the electrolyte can remain uniform, as is evenly distributed next to the active substances.

Each cell in the present invention is subdivided into two compartments, the positive compartment, close-packed with positive globules, and the negative compartment close-packed with negative globules. Each compartment stretches transversely, across the width of the battery. The two compartments are separated by a dielectric separator, which allows free passage to the electrolyte, while preventing electrical contact between globules of opposite polarity. The dielectric separators are simply means for preventing globules of opposite polarity from touching, which can be accomplished with a solid dielectric wall having small enough holes and sufficient thickness, or with a dielectric woven material with sufficient thread density to prevent such direct contact. The requirements for the separators used in the present invention, which allow relatively free circulation of the electrolyte fluid, are, therefore, much more relaxed than the requirements of ionically permeable separators in the previous art, such as porous filters, which contribute to the high internal resistance of the battery.

Cells made of simple pairs of negative and positive compartments in tandem in the present invention, replace the multiplicity of interleaved negative and positive plates in each cell of the conventional lead-acid batteries. If the globules were to be viewed as particles of solid substances, it takes only a few such particles in the present invention to make the thickness of a plate, while providing a greater amount of solid active substances to interact with the electrolyte. The weight of the grids, which serve to hold the active solid substances in the form of paste, and which also act as conductors of electrons between individual particles and the electrodes of the cell in conventional lead-acid batteries, is hereby eliminated in the present invention.

The present invention, while it retains fluidity so the active substances can be replaced, it eliminates the need for circulation of the active materials, as is required by the Fluid Circulating Battery System. The battery construction in accordance with the present invention can be applied to both the lead-acid and alkaline batteries, where the electrolyte displays different behavior. In the case of alkaline batteries, such as the nickel iron Edison cell, where the density of the electrolyte does not change during charge and discharge, the electrolyte provided next to the globules suffices and no circulation of electrolyte would be needed, whatsoever. Also in small size lead-acid batteries, sufficient space for the electrolyte needed can be accommodated inside the battery casing. However, because of the high surface efficiency of the convoluted globules, and especially in connection with larger size lead-acid batteries substantial amount of additional electrolyte, than cac fit in the main battery casing, may be needed. In this case an external storage of electrolyte can be established, and pumping means can be provided to circulate the electrolyte along the length of the battery and the supplementary storage unit, at rates proportional to the current demand.

Electrical connection of one cell with the next is achieved through a conductive separator, which is stretched transversely across the width of the battery. It provides electrical connection between the positive globules in the positive compartment of one cell with the negative globules of the next cell; it also provides relatively free passage to the electrolyte while preventing globules of the opposite polarity from intermixing. The conductive separator may be constructed in the form of a conductive plate having a multiplicity of small holes for allowing passage to the electrolyte; or it may be constructed out of a dielectric material with a multiplicity of openings of dimensions large enough for the globules of opposite polarity to touch through the openings, but small enough to prevent the globules from actually passing across to intermix. The requirements of the conductive separator can, therefore, also be met by a simple dielectric net with proper size openings. The present invention thus eliminates the need for running hefty metallic conductors for the series interconnection of the cells inside the battery.

In the present invention the first and the last cell walls must be conductive, preferably metallic walls as they must be directly connected to the external terminals of the battery.

It may also be noted that in the present invention the voltage gradient in the electrolyte varies smoothly from the negative to the positive terminals along the length of the casing. This is not the case in conventional lead-acid batteries, where the potential in the electrolyte reverses itself to follow the alternation of the negative and positive plates within each cell, creating the need for the solid case wall between cells. In the present invention the electrolyte is allowed to flow freely through the cells so its density can remain uniform throughout the entire battery.

Accordingly it is an object of this invention to provide a more efficient electrical storage apparatus having globules of anodic and cathodic active substances close-packed in electrolyte, in positive and negative compartments, respectively; instead of multiplicities of interleaved positive and negative plates now used in conventional batteries.

Another object of this invention is to provide a storage battery in which the active substances are in the form of globules mixed with electrolyte so that they can easily be pumped out as a fluid and be replaced by fresh, charged such fluids; thereby reactivating the battery and prolonging its life indefinitely.

A further object of this invention is to provide a storage battery in which the active substances are in fluid form so that after manufacture the solid active substances and the electrolyte can be conveniently stored and shipped in separate containers, to be added to the battery at the time it is activated for use. This feature eliminates deterioration of the battery while in storage, and helps save cost in processing and transportation.

Another object of the present invention is to provide a volume efficient battery by eliminating the need for plate grids or other internal electrodes, the multiplicity of separators per cell, and solid walls separating cells, all of which are components of the conventional lead acid batteries, which collectively occupy approximately half their weight and volume.

Another object of the present invention is to provide a quasi fluid storage battery with low internal resistance, capable of storing and returning electrical energy with low internal potential drop and low heat losses during charge and discharge.

It is a further object of the present invention to provide a lead-acid battery with high watt-hour per pound rating, by providing a supplemental electrolyte storage unit with pumping means for circulating the electrolyte along the main battery casing and supplemental storage, proportionately to the current demand.

Still another object of the present invention is a storage battery which can provide better accessibility of active materials to both anions and cations of the electrolyte; thereby enabling a more complete charge and discharge and at higher current rates than in conventional batteries.

Other objects and features of the invention will appear as the description of the particular physical embodiments are selected to illustrate the invention processes. The various features of novelty, which characterize the invention, are pointed out with particularity in the claims annexed to and forming a part of this specification. In addition, for a better understanding of the invention, its operating advantages and specific objects attained by its use, references is made to the accompanying drawings and descriptive matter in which there are illustrated and described preferred embodiments of the invention.

The invention is illustrated diagrammatically in the accompanying drawings by way of examples. The diagrams illustrate only the principles of the invention and how these principles are employed in various fields of application. It is, however to be understood that the purely diagrammatic showing does not offer a survey of other possible constructions, and a departure from the constructional features, diagrammatically illustrated, does not necessarily imply a departure from the principles of the invention. It is, therefore to be understood that the invention is capable of numerous modifications and variations to those skilled in the art without departing from the spirit and scope of the invention.

In the accompanying drawings, forming part hereof, similar reference characters designate corresponding parts.

BRIEF DESCRIPTION OF DRAWINGS

The details of my invention will be described in connection with the accompanying drawings in which:

FIGS. 2(a,b,c) are perspective views pertaining to a particular kind of globule maid out of two cintered hemispherical sections, shown in FIGS. 2b and 2c, which are cemented together into the whole, hollow globule with openings at both poles, shown in FIG. 2a.

FIGS. 3(a,b,c) are perspective views pertaining to a globule which is made of a dielectric bead, a cross-section of which is shown in FIG. 3a, wrapped outside and inside with a rectangular piece of foil of an active solid substance shown in 3b, into the final globule the crossection of which is shown in FIG. 3c.

FIGS. 4(a,b) are perspective views pertaining to a globule which is made of a dielectric bead, the cross-section of which is shown in FIG. 3a and wrapped with a circular piece of foil of an active substance shown in FIG. 4b, into a final globule the cross-section of which is shown in FIG. 4a.

FIG. 7 is a perspective view with sections removed for clarity, of an alternate construction of the cells of FIG. 1, where the two compartments are provided in the form of a pair of dielectric baskets, close packed with globules. The baskets can be easily removed from the battery and be refilled with new globules before they are returned to the battery casing shown in FIG. 1.

FIG. 8 is an isometric view with portions cut away for clarity, of the battery shown in FIG. 1, here being implemented with means for quick draining both types of globules with electrolyte.

(a) Position for emptying globules in which positive and negative globules with electrolyte are guided to two separate chambers of the valve tube.

(b) The valve's normal position, rotated 180 degrees from its position in (a), now preventing both types of globules and the electrolyte from entering the chambers of the valve tube.

BEST MODE FOR CARRYING THE INVENTION

Figure 1:
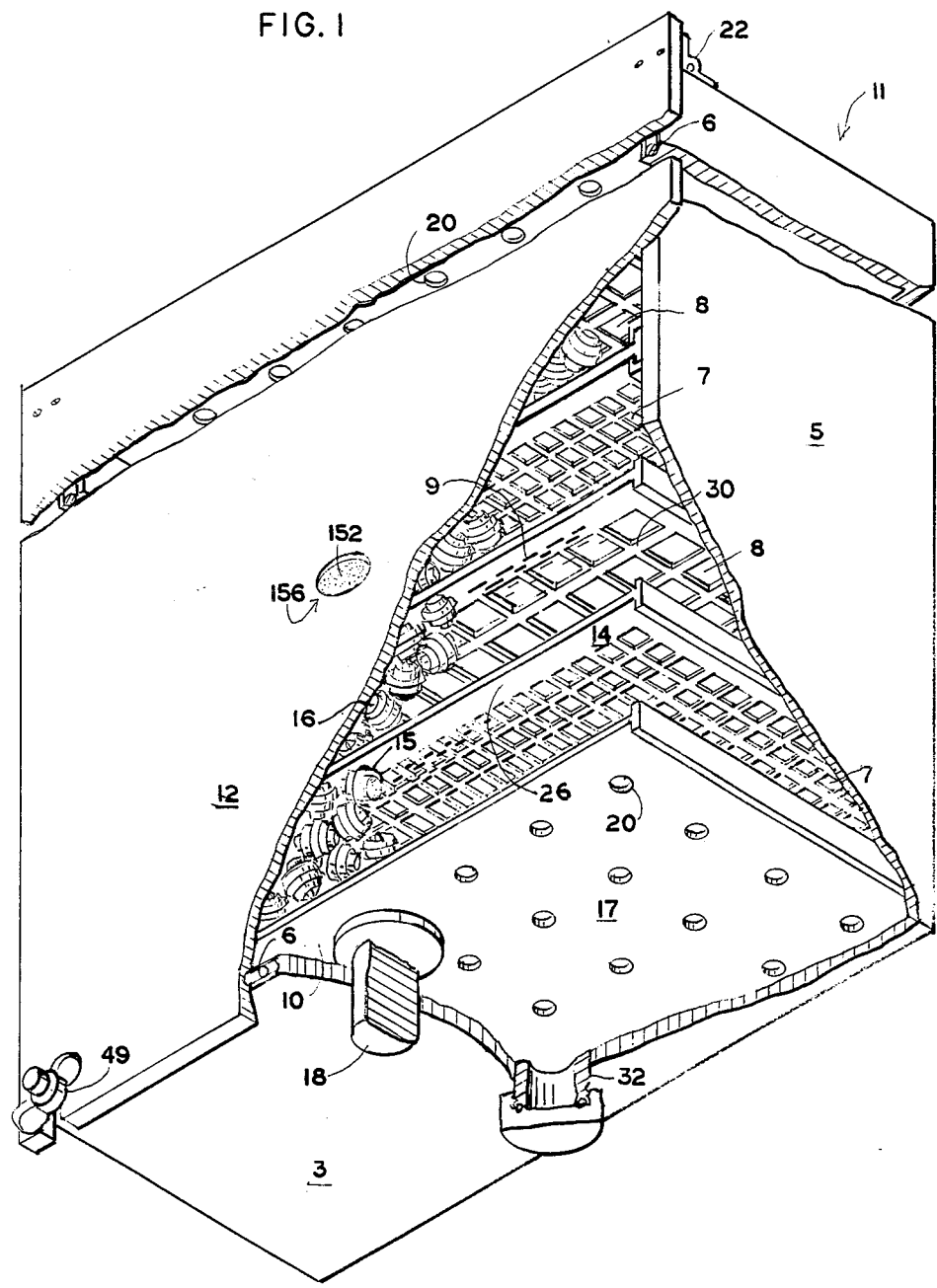
FIG. 1 is an isometric view of the basic mode for carrying out the invention, with portions cut away for clarity.

Referring to FIG. 1, the battery housing 11 is shown to have a substantially rectangular shape, comprising a main casing 5 and a cover 12, pivoted at hinges 22, which are installed at the rear of the casing 5, enabling the casing 5 to be covered and uncovered. The cover 12 can be tightly locked by a latch and butterfly tightening means 49, against the force from compressing a rubber sealing element 6, disposed along the edge between the wall of the main casing 5 and the cover 12.

A. Cells and separators

The housing 11 is internally divided in compartments 7 and 8, which are close-packed in electrolyte with negative globules 15 and positive globules 16, respectively. The compartments 7 and 8 provide in the present invention similar function as negative and positive plates in conventional batteries; therefore, they are referred to in this description as negative and positive compartments, respectively. The combination of a negative compartment 7 and a positive compartment 8 makes up a cell.

The positive compartments 8 are separated from the negative compartment 7 in each cell by a dielectric separator 26, which serves to separate and insulate the two regions by preventing the negative globules 15 from coming into electrical contact with the positive globules 16; but allows relatively free passage to the electrolyte 9.

The dielectric separator 26 is shown in FIG. 1 molded out of an inert plastic, with perforations large enough to permit free passage to the electrolyte, but small enough for preventing globules of opposite polarity from touching. The dielectric separator 26 may also be constructed out of an inert material, such as fiber glass cloth (as separator 24 shown in FIG. 8) but woven with sufficient density as to prevent globules of opposite polarity from touching; the cloth would be stretched across the width of the battery, and would preferably be supported by a frame, such as frame 14, which in FIG. 1 is now shown supporting the perforated portion of the separator 26.

Adjacent cells are separated by conductive separators 30, which allow electrical continuity between the positive globules 16 of one cell with the negative globules 15 of the next cell; therefore they provide the function of the series interconnecting conductors between the positive electrode of one cell and the negative electrode of the next cell in conventional batteries. The separators 30 may be constructed in the form of a thin plate 17, out of an electrically conductive material, such as, would be antimonial lead in the case of lead-acid batteries. The small holes 20 on the face of the plate 17 are for allowing easy passage to the electrolyte. Preferably, though, the conductive separators 30, with the exception of the first and last plates 17, may also be fabricated out of an inert perforated dielectric sheet, or be woven out of an inert thread, such as fiber-glass thread, in the form of a net with openings; in either case, large enough to allow the positive globules 16 and the negative globules 15 to touch, but small enough to restrict the opposite polarity globules from intermixing. The plates 17, next to the front and rear walls of the casing 5, are used to carry the negative and positive terminals 18 and 19 of the battery, respectively, besides being used to evenly stribute the electrolyte when it is being circulated through the battery; therefore they should remain metallic conductive plates.

B. Globules

The shape and construction of the globules 15 or 16 may vary widely. There are four requirements or criteria, which enter into the selection of the shape and construction of the globules:

(1) Large area/volume ratio, for high volumetric efficiency.

(2) Allowing the electrolyte easy access to the solid active substances for a high Ah efficiency.

(3) Small resistance between any two solid active particles on the globule for a low battery internal resistance.

(4) Small, relatively light, and round shaped so that the globules can easily be pumped with electrolyte, as a fluid, for replacement of the active substances.

An example of globules would be small spheres cintered out of powder of the solid active material to provide porosity for the electrolyte to reach the particles. In a cintering process the powder is compressed under controlled temperature and pressure until the edges of the powder particles slightly diffuse into each other at multiple contact points to produce a porous material. The drawback of this type of globule would be that the particles near the center of the globule may not fulfill the above globule requirement (2). If cement were to be used to hold particles together, the requirements (2) and (3), above, would probably not be fulfilled.

To avoid these problems the globule can be made out of two hemispherical shells, as shown in FIGS. 2b and 2c, which are cintered out of the particular active substance, and then cemented together, along the edge only, into a hollow globule as shown in FIG. 2a. The openings 54 and 55 at the poles are to provide the electrolyte easy access to the internal surface, and for using the internal volume of the globule for electrolyte storage.

A second example of globules would be thin walled beads, preferably with openings at both poles and covered, preferably inside and outside, with the solid active substance. The covering of the globule surface may be accomplished through spattering of the surfaces with hot plasma, or by vapor deposition, or by wrapping the bead, with a foil made out of the active material. The foil may be just rolled; or it may, in addition, be spattered with hot spray of the proper substance; or it may be cintered from powder particles for greater porosity. The purpose of the holes 54 and 55 on the poles of the bead is to enable the manufacturer to introduce the active material along its internal surface, as shown in FIG. 3c, and to be able to use the internal space of the bead for storing electrolyte in the immediate vicinity of the solid active substances. The drawback of this approach is that it may not satisfactorily fulfill the above globule requirement (1).

FIG. 3c shows a cross-section of a globule 58, comprising a neutral bead 59 onto which a rectangular foil 56 of the desired active material has been wrapped along both the outside and the inside surfaces, by automated means, not shown.

A small variation of same concept as above is shown in FIG. 4a, where a globule 58 is constructed out of a neutral bead 59 with openings 54 and 55 at the poles, on to which a circular piece of foil 68 of the desired active material has been wrapped along both the outside and the inside surfaces, by automated means, not shown.

Figure 5:
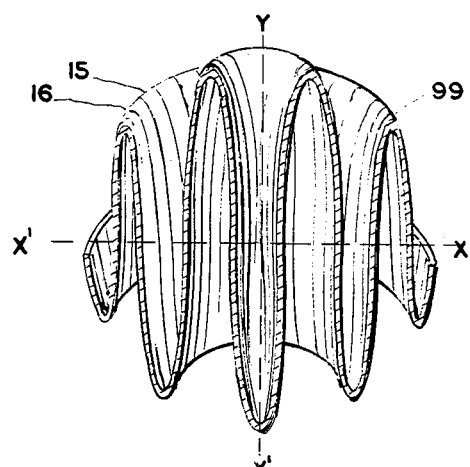
FIG. 5 is a cross-sectional isometric elevation view of a preferred convoluted globule, showing its cross-section to obey a sinusoidal functional relationship in the X-Y plane.

A third and the preferred example of globules is shown in FIG. 5, where the solid active material in the globules 15 and 16 is provided in the form of the globule 99, where a thin wall is folding back and forth inside an imaginary spherical surface. Each fold, or convolution, provides surfaces on both sides. The globule in FIG. 5 is designed to have its surface varying sinusoidally in the Y direction as a function of X. Further, as shown in FIG. 5, the width of each period has been adjusted to be approximately proportional to the amplitude of the wave so that the ions can find a wider path when they have to travel deeper inside the globule space. There are three advantages of the shape of the wall of the globule 99 shown in FIG. 5:

(1) It provides an optimum surface/weight ratio, while allowing relatively free interaction between the electrolyte and both surfaces of the globule.

(2) The shape in FIG. 9c provides the draft needed during manufacture, so that after a compressional impact, the globule can be easily separated from shaping molds 101 and 103, and (3) It provides a better surface component towards the outside for hot spattering to add to the solid material and to enhance the rigidity of the globule, when such additional operation would be desirable.

Figure 6:
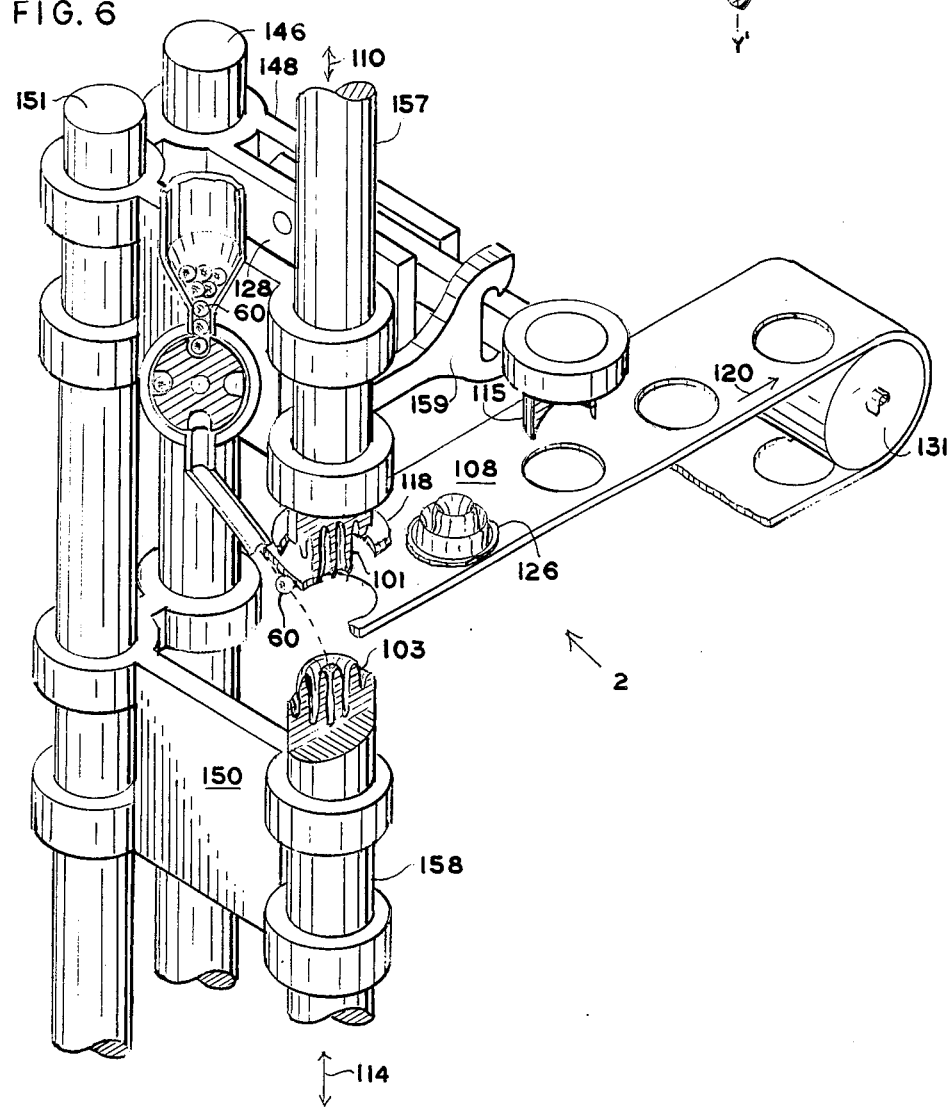
FIG. 6 is an isometric elevational view showing a method of manufacture of surface convoluted globules, of FIG. 5, with portions of it in cross-section for further clarity.

Referring now to the FIG. 6, impact extrusion means 2 is described for the fabrication of thin walled covoluted globules 99. Support for the extrusion means 2 is provided by two vertical poles 146 and 151, which are rigidly secured on a base, not shown. The horizontal structural members 148, and 150, which provide support and bearing surfaces to plungers 157 and 158, are then secured to the poles 146 and 151. A horizontal structural member 148 provides support and pivot to punch 115.

The solid material comes in the form of solid pellets 60. Upper mold 101 and lower mold 103, having conforming shapes, are operable to compress and cause the material of the pellet 60 to melt due to pressure and fill-in the space between the molds. The energy needed for this operation is provided by hydraulic forces applied along the direction of the arrows 110 and 114, causing plungers 157 and 158, which hold the molds 101 and 103, respectively, to close, and thereby, shape the material of the pellet 60. The molded globule 99 remains on the belt 108 as the plungers 157 and 158 go apart. This is accomplished through some of the surplus pellet material 126, which extrudes outside the molds and prevents the globule 99 from being carried downward by the lower mold 103 as it is obstructed by the belt 108; while a semi-circular retaining member 118 is temporarily positioned, by means not shown, over the surplus material 126 to prevent the globule 99 from being carried upwards with the upper mold 101.

Immediately following the withdrawal of the molds from the globule 99, the retainer 118 is also withdrawn, by means not shown, to permit a predetermined displacement of the belt and globule 99 in the direction of the arrow 120, bringing the globule 99 under the punch 115. The surplus material 126 is then punched out during the next molding operation, as the punch 115, pivoted about a pin 128, is forced downward by an arm 159, attached to the plunger 157. The globule is then carried by the belt 108 in the direction of the arrow 120, until it is toppled over the belt cylinder 131, into a collecting basket, not shown.

C. Means for Draining the Active Substances from the Battery.

FIG. 7 shows a species of the invention where each cell of the battery in the present invention is constructed in the form of two integral baskets 134 and 135, providing for the negative compartments and positive compartments, respectively. The baskets 134 and 135 may be molded out of an inert plastic material, having the transverse walls perforated as shown in FIG. 7. For convenience in manufacture, the size of the openings on all these walls can be the same, large enough to permit the globules in opposite sides of the walls to touch through the openings but small enough to prevent globules of opposite polarity from intermixing. The perforated walls of the baskets are now being used as separators. This criterion for the size of the openings takes care of the two conductive separators 13 and 24. The non-conductive separator 26 can then be formed by displacing the pattern on the rear wall 136 of the basket 134, half a pattern step both downward and sideways, bringing the crossings of the patterns of the wall 137 at the center of the openings of the wall 136, and vice versa, as shown in FIG. 7. As is required in the case of a non-conductive wall 26, the combination of the two walls 136 and 137, then, allows relatively free passage to the electrolyte, but prevents the globules of opposite polarity from touching.

As the basket 134 represents a negative compartment in the present invention, it is close-packet with negative globules 15; while the basket 135, representing a positive compartment, with positive globules 16. The negative basket 134 can be distinguished as having the perforation pattern of the rear wall shifted. The basket 134, therefore, must always be placed in the battery with the wall 136 in the rear, adjacent to the positive basket 135. It may be noted that the orientation of the basket 135 is of no consequence. The baskets 134 and 135 may be molded out of different color dielectrics, such as red for positive and white for negative for more clear identification of the two types of baskets.

Foldable handles 138 and 139 can be turned vertical, from the horizontal position shown in FIG. 7, to be used as catches during removal of the baskets from the casing 5. Once out of the battery casing 5, the baskets can be emptied and be refilled with new and/or charged globules, for instantly recharging the battery, or for rejuvenating the battery after long use.

The baskets 134 and 135 may be standardized, with cover 143 in which case they may be filled permanently with the appropriate type of globules and sealed with the covers 143, so that the above operation of changing the globules may be accomplished by changing globules and baskets together. Then for rejuvenating the battery, the case 5 can be emptied and can be refilled with new baskets with globules, while the old baskets with globules may be sent back to the manufacturer for recycling. After a change, the density of the electrolyte must always be checked and be adjusted according to the manufacturer's specifications. It may be noted that the globule arrangement provided by the present invention will be more durable than plates in conventional batteries for the reasons already explained and, therefore, rejuvenation, will need take place only after much longer intervals of use.

Taking the concept of the sealed baskets with globules a little further, a similar species of the present invention can be provided with the compartments in the form of bags, woven out of an inert thread, such as fiber-glass, and be sealed, for example by sewing across the top, after being filled with the appropriate type of globules. To avoid repetition of FIG. 7, the concept of bags will now also be described in terms of FIG. 7, which contains all the essential elements and same geometry for also representing compartments made in the form of bags. The bag containing the negative globules can have its non-conductive separator wall 136 woven densely enough as to prevent contact of its globules with the globules of the positive bag adjacent to it; while the material for the front wall 133 and that for both walls of the positive bag 135, can be woven as a net to provide openings of size characteristic to conductive separators 30. As in the case of the baskets 134 and 135, the negative and positive bags can be given different colors for a clearer indication of their polarity.

Figure 9:
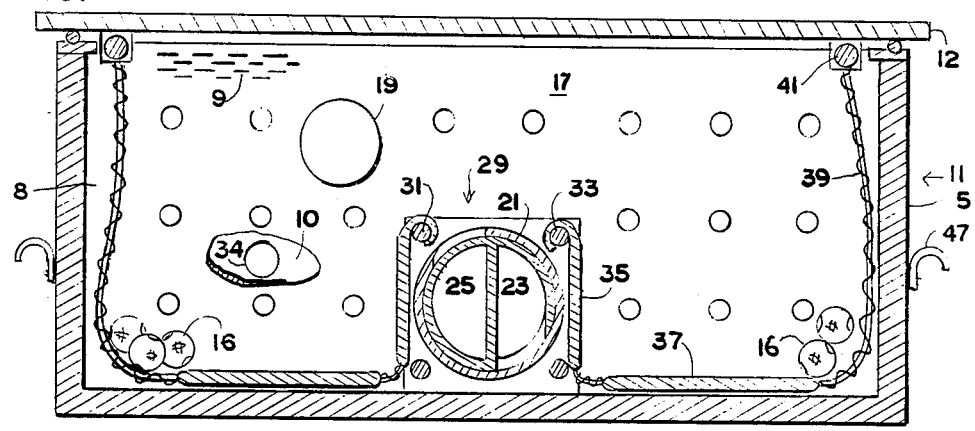
FIG. 9 is a front elevation, cross-sectional view, along lines AA' of FIG. 8.
Figure 10:
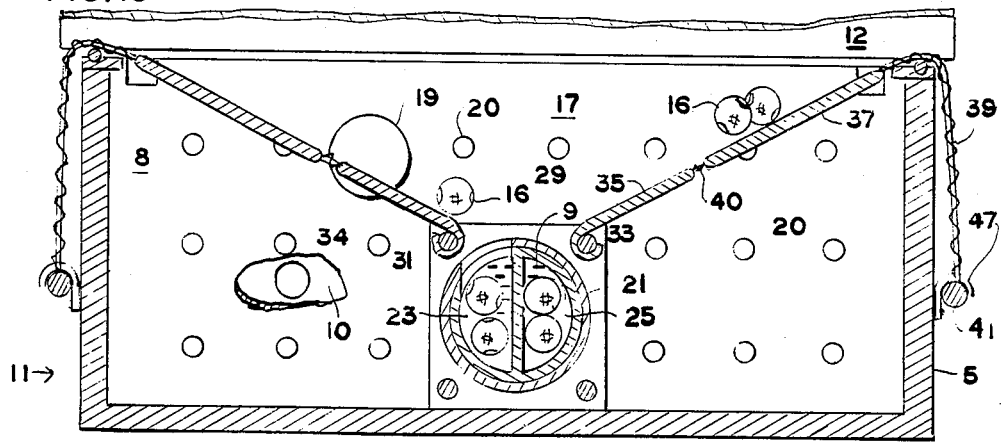
FIG. 10 is same cross-sectional view as in FIG. 9, but here showing the lanyards stretched, as they would be during draining of globules and electrolyte.

Another approach for quickly draining the globules of the battery in the present invention, involves means built inside the battery casing 11 and explained in the FIGS. 8, 9, 10, and 11. Referring now to FIGS. 8, 9, 10, and 11, the assembly 29, disposed at the lower center, and along the length of the battery casing 5, provides means for draining the globules 15 and 16 with the electrolyte 9, as a fluid. In the center of the assembly 29, a two-chamber valve tube 21 provides chambers 25 and 23, shown in FIGS. 8, 9, 10, and 11, for separate channeling of the positive and negative globules, 16 and 15, respectively. FIGS. 8, 9, and 10 show lanyards 1, one on each side of each compartment. Each lanyard 1 comprises: a rigid member 35, pivoted around pins such as pins 31 or 33; a flexible hinging section 40; a straight rigid section 37; a flexible section 39; and rods 41, which provide support to the ends of all lanyards. The reason for the rigid sections 35 and 37 in the lanyard assembly is to prevent twisting of the band, that would allow globules to spill over the side edge into the space under the lanyards.

Figure 11:
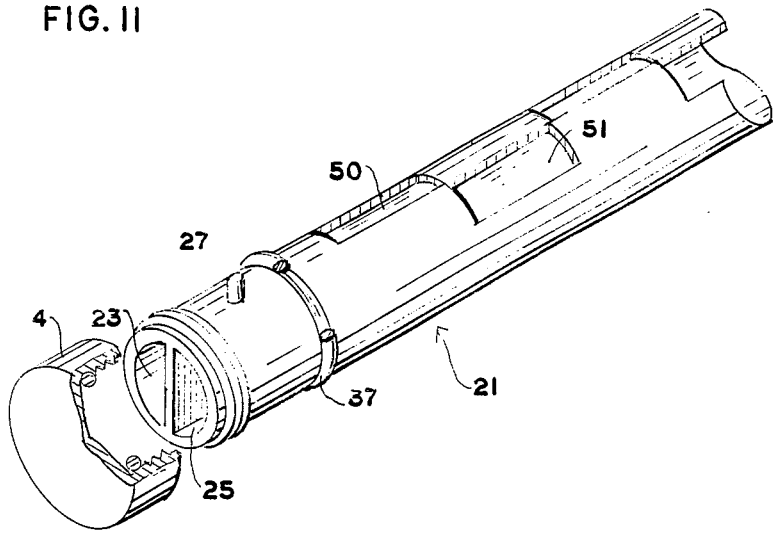
FIG. 11 is an isometric view of a two chamber valve tube, which is part of a the embodiment shown in FIG. 8 and which can assume two rotational positions.

The valve tube 21 is shown in FIG. 11 in the rotational position for emptying the globules and the electrolyte from the battery compartments. Pumping means, not shown, can be attached onto the front of the valve tube 21 and be locked in position by means of a pair of protrusions 27. With the cover 12 of the battery open, the lanyard rods 41 can gradually be pulled, outwardly, from a position shown in FIG. 9 to a new position shown in FIG. 10, and held on each side by catches 47. The negative globules 15 are being washed with the electrolyte through the apertures 50 and the positive globules 16 through the apertures 51, as they are pumped into two separate storage tanks, not shown. If any globules remain in the casing, they may be washed with a jet of electrolyte, which can be pumped from the storage tanks, down the ramp formed by the stretched lanyards.

After the globules 15 and 16 and the electrolyte 9 have been drained into separate storage tanks from the casing of the battery 11, the valve 21 is rotated 180 degrees as shown in FIGS. 8 and 9, where all passages from the compartments to the valve chambers are sealed and neither globules or electrolyte can leak out. A combination of an "O" ring 37 with an end cover 4, on each side of the valve tube 21 serves to seal the valve tube and prevent leakage.

When pumping means are used to refill the compartments with globules and electrolyte, the electrolyte circulating means may also be used concurrently, to remove the excess electrolyte until each compartment is close-packed with the appropriate globules; then the cover 12 can be closed and the electrolyte circulating means be used to fill-in the remaining space with electrolyte through the inlet 32.

It is to be understood that the means for draining out the globules and electrolyte from the compartments of the battery, namely the assembly 29 with the valve tube 21 and the lanyards 1 are not to be considered necessary parts of the invention. Their function is to expedite the replacement of the active substances, especially for batteries used in applications where a quick charge is essential. This, for example can be the case in electric automobiles where the driver would like to stop at a station and have his battery quickly reinstated to full charge by a replacement of the globules and electrolyte with charged ones.

For all other cases, where replacement of the active substances is to take place for the sole purpose of rebuilding the battery after a long period of use, the globules, when no baskets or bags are used, can be pumped out with the electrolyte and be replaced through the top, after opening the cover 12. This certainly will be the case for the small size batteries used for ignition in automobiles, and for the stationary large size batteries used for storage of large quantities of electricity, in power plants to even out production.

D. Electrolyte

Referring back to FIG. 1, the electrolyte 9 fills the space between globules and the space inside globules, between the folds of the convoluted surface in the preferred design of globules 99, shown in FIG. 5. The electrolyte 9 also serves as a fluid medium to carry with it the globules during changes of the active substances of the battery in the method described in connection with FIG. 8.

In the case of small size batteries, such as those used for ignition in automobiles, sufficient electrolyte can be stored inside the casing 11 to chemically balance the solid materials in the globules. For larger size lead-acid batteries, as for electric vehicles, and for batteries used by power plants to store large amounts of electricity, the invention provides for circulation of the electrolyte along the length of the battery and through a supplementary electrolyte storage, not shown, at rates proportional to the current demand.

FIGS. 1, 8 and 9 show inlet 32 and outlet 34 on the casing 11, to which the electrolyte circulating means, not shown, can be attached for connecting the casing 11 with the supplementary storage and pumping means, not shown. The inlet 32 allows electrolyte to first feed into a distributing chamber 10, bounded between the front wall 3 of the case 11 and the negative conductive plate 17. The plate 17 comprises small holes 20 along its entire surface, through which the fresh electrolyte can be evenly distributed along the entire cross-section of the first compartment 7. The fresh electrolyte mixes with the electrolyte in the casing 11 as it moves along the length of the casing; then it exits through small holes 20, along the surface of the positive conductive plate 17, next to the rear wall of the casing 5, into a second short distribution chamber, serving same function as chamber 10, but in reverse, now feeding the return outlet 34.

Breathing means 152 allows gases such as hydrogen, released inside the casing 11, to escape through a gas permeable membrane 156, held by retaining ring 152, while preventing passage to the electrolyte.

It is to be understood that while only a few types of existing batteries have been described, the present invention is not limited to particular chemical reactions; but that the invention provides novel topological principles and methods of battery construction, irrespective of chemical reactions.

I claim:

1. A storage battery comprising:
   a casing;
   negative globules at least partially made out of a cathodic active substance;
   positive globules at least partially made out of an anodic active substance;
   appropriate electrolyte for interacting with said negative and said positive globules;
   at least one negative compartment close-packed exclusively with said negative globules in said electrolyte;
   at least one positive compartment close-packed exclusively with said positive globules in said electrolyte, and positioned adjacent to and in contact with said negative compartment so that the combination of said negative and said positive compartments in tandem, form a battery storage cell;
   negative and positive electrode terminals on said casing; at least one non-conductive separator for providing common surface boundary to said negative and said positive compartments, and for preventing said negative globules in said negative compartment from coming in direct contact with said positive globules in said positive compartment, while allowing relatively free passage to said electrolyte;
   at least two conductive separators allowing relatively free passage to said electrolyte and establishing electrical continuity between two cells or between the compartments at the ends of said casing and said terminals of said casing, the first separator providing a second boundary surface to said negative compartment, and the second separator providing such a boundary to said positive compartment.

2. The storage battery according to claim 1 further comprising two conductive surfaces, the first in direct electrical contact with both the globules of the negative compartment and the negative terminal, disposed on the negative end of the battery, and the second conductive surface in direct electrical contact with both the globules of the positive compartment and the positive terminal, disposed on the positive end of the battery.

3. A storage battery according to claim 2, wherein said casing comprises a lower main casing means and cover means, operable to allow said casing to open, for exposing and allowing access, removal, and replacement of said positive and said negative globules with said electrolyte.

4. The storage battery according to claim 3, further comprising electrolyte inlet means and electrolyte outlet means, for allowing, when desirable, circulation of said electrolyte between said casing and a supplemental external electrolyte storage unit.

5. The storage battery according to claim 1 wherein said conductive separators comprise thin conductive plates for providing electrical continuity between said positive globules of said positive compartment of one cell the said negative globules of said negative compartment of the next cell, said plates having holes for allowing relatively free flow to said electrolyte.

6. The storage battery according to claim 1 wherein said conductive separators are constructed out of a dielectric material with openings of size large enough for said negative globules of one cell to touch, through the openings, with said positive globules of the next cell, but small enough to prevent globules of opposite polarity from intermixing; while permitting relatively free passage to said electrolyte.

7. The storage battery according to claim 1 wherein said conductive separators are woven out of a dielectric thread providing openings of size large enough for said positive globules of one cell to touch through the openings with said negative globules of the next cell, but small enough to prevent globules of opposite polarity from intermixing; while permitting relatively free passage to said electrolyte.

8. The storage battery according to claim 1 wherein said non-conductive separators are constructed out of a dielectric material with openings of size small enough as to prevent said negative globules of said negative compartment from touching with said positive globules of said positive compartment, but large enough to allow relatively free passage to said electrolyte.

9. The storage battery according to claim 1 wherein said non-conductive separators are woven out of a dielectric thread at sufficient density as to prevent said negative globules of said negative compartment from touching with said positive globules of said positive compartment, but large enough to allow relatively free flow of said electrolyte.

10. The storage battery according to claim 3 wherein the pair of said negative and said positive compartments, forming a cell, comprise a pair of removable baskets, the first basket being close-packed with said negative globules and the second close-packed with said positive globules, and both immersed in said electrolyte, said baskets further providing said non-conductive and said conductive separators in the form of openings along their transverse walls.

11. The storage battery according to claim 3 wherein the pair of said negative and said positive compartments comprise a pair of removable bags close-packed with said negative and said positive globules, respectively, and immersed in said electrolyte, said bags further providing said non-conductive and said conductive separators in the form of openings along their transverse walls.

12. The storage battery according to claim 4 further including lanyard means and a two chamber valve means for inter-connecting said casing to pumping means, for quickly draining said negative globules and said positive globules with said electrolyte, as a fluid, from said casing, before replacing same, for charging and/or rejuvenating said battery.

13. The storage battery according to claim 2 wherein each of said conductive surfaces is recessed from the end wall of said casing for allowing a narrow electrolyte distribution chamber to exist between the end wall and said conductive surface, and wherein each of said conductive surfaces comprises a plurality of holes evenly distributed over said surface, for distributing the circulating electrolyte from said inlet means over the entire cross-section of said casing, and for condensing the circulating electrolyte from the entire cross-section into said outlet means.

14. The storage battery according to claim 2 wherein said negative globules and said positive globules each comprises substantially hemispherical shells cintered out of respective active substances and cemented along the edge into a substantially spherical globule with a hole at least at one of its poles.

15. The storage battery according to claim 2 wherein said negative globules and said positive globules each comprises substantially spherical hollow beads with holes at both poles, onto which is wrapped a piece of foil made of the desired active substance.

16. The storage battery according to claim 2 wherein said negative globules and said positive globules each comprises substantially spherical hollow beads with holes at least at one pole, onto which has been deposited the desired solid active substance.

17. The storage battery according to claim 2 wherein said negative and said positive globules each comprises a convoluted wall made out of the appropriate solid active substance, for presenting a large surface to said electrolyte per unit of weight.

18. The storage battery according to claim 17 wherein said convoluted negative globules and said convoluted positive globules comprise a wall whose cross-section provides a substantially sinusoidal variation.

19. The storage battery according to claim 17 wherein said convoluted negative globules and said convoluted positive globules are fabricated by impact extrusion means.

* * * * *